Jan. 18, 1949.  C. P. TOLMAN  2,459,347
DUAL WHEEL ASSEMBLY
Filed May 25, 1946

INVENTOR
Charles P. Tolman
BY
Morgan, Finnegan and Durham
ATTORNEYS

Patented Jan. 18, 1949

2,459,347

UNITED STATES PATENT OFFICE 2,459,347

DUAL WHEEL ASSEMBLY

Charles P. Tolman, Kew Gardens, N. Y., assignor to Differential Wheel Corporation, Detroit, Mich., a corporation of Delaware Application May 25, 1946, Serial No. 672,326

1 Claim. (Cl. 301—36)

The present invention relates to dual wheel structures and comprises a modification and improvement of the dual wheel structures and assemblies disclosed in the C. S. Ash United States Letters Patents 2,192,023, dated February 27, 1940, and 2,275,025 dated March 3, 1942, to which reference should be made to structure common between said patents and the present application and which is or may not be specifically described hereinafter because it is not necessary to an understanding of nor forms a part of the present invention.

One object of the present invention is to provide a dual wheel assembly having greater stability and requiring less maintenance attention than the assemblies of the before referred to C. S. Ash patents and of structures heretofore known and in use.

Another object of the invention is to provide a novel construction and arrangement of parts to produce a dual wheel assembly the lubrication of the bearings of which is simplified and improved over other dual wheel assemblies now known and in common use.

A still further object of the invention is to provide a simple, efficient and novel locking means for the lock ring of one of the wheel axle bearings.

The invention consists in the novel parts, constructions, arrangements and combinations and improvements hereinafter illustrated and described and from which description and illustrations other objects, novel features of construction and improved results will be understood.

Still further objects and advantages will be apparent to those skilled in the art and can be learned by the practice of the invention.

The accompanying drawings, constituting a part hereof, and hereinafter specifically referred to illustrate one embodiment of the invention and together with the description serve to explain the principles of the invention but the invention is to be limited only within the scope of the hereinafter following and appended claim.

Figure 1:
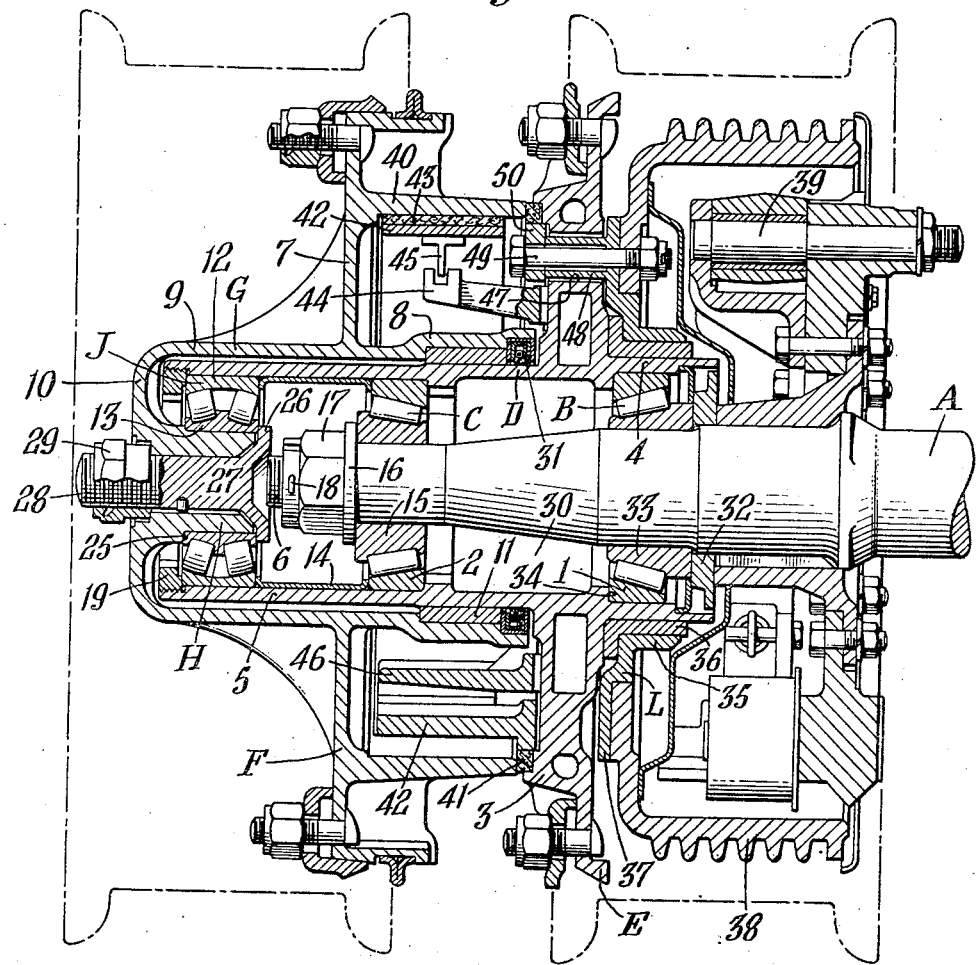
Fig. 1 is a vertical sectional view through a dual wheel assembly illustrative of an embodiment of the present invention.
Figure 2:
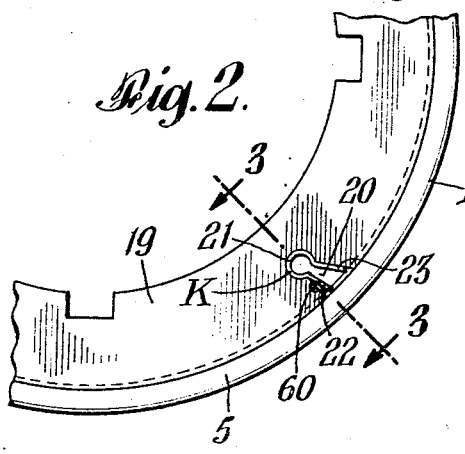
Fig. 2 is a fragmentary end view of a lock ring for the outer end of the outboard bearing for the hub of the outer wheel.
Figures 3, 4:
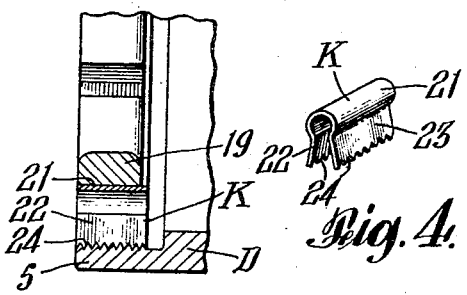
Fig. 3 is a sectional view on the line 3—3 of Fig. 2 looking in the direction indicated by arrows.
Fig. 4 is a detailed perspective view of the resilient lock for the bearing lock ring.

As will appear in part from the following description and will be readily understood by reference to the aforeidentified C. S. Ash patents the dual wheel assemblies are for the purpose of providing a novel vehicle wheel assembly which is relatively simple and powerful of construction and designed for the purpose of permitting independent rotation of a pair of side by side wheels which are capacitated to transport heavy loads over practically all kinds of roads and to provide this transportation while imposing the minimum wear upon the drive and minimum strain upon the wheels. Additionally the wheels provide simple yet reliable and efficient braking means conveniently and accurately under the control of the driver and acting automatically to lock the wheels together when braking action is taken so as to assure that uniform braking action is exerted on both of the wheels and to thereby avoid surface drag or skid on the wheel-carried tires. Still further the assembly embodies a construction to provide adequate lubrication for all the moving and contacting parts so as to avoid the dire results which follow inadequate lubrication and resilient tire bearings.

Describing the invention in detail by reference to the accompanying drawings A is a vehicle axle upon which the dual wheel assembly including the wheel braking mechanisms are supported. A pair of spaced self-aligning radial-thrust bearings B and C mounted on the axle rotatably support upon their outer race rings 1 and 2 the elongated outwardly extending hub D of the inner wheel E. The inner wheel web 3 is positioned adjacent the inner end of the hub so that at one side thereof there is a short inwardly extending hub end 4 while at the other side there is an elongated outwardly extending hub end 5 which extends a considerable distance outwardly beyond the outer threaded end 6 of the axle. The inner hub end 4 is supported upon the inner bearing B while the outer bearing C is a considerable distance inboard of the outer end of the outwardly extending hub portion 5. The outer wheel F has a web 7 connected to a main hub G intermediate the length of said hub with the result that there is an inner hub end 8 and an outer hub end 9. The outer hub end 9 is turned inwardly as at 10 and then rearwardly to form a supplemental hub H which is disposed interior of the outer end 5 of the inner wheel hub D.

The outer wheel hub G is of greater diameter than the inner wheel hub which it telescopically receives. Throughout the greater portions of their paralleling lengths these hubs are in spaced relationship. The inner end of the outer hub is rotatably supported upon a heavy duty self-lubricating bearing 11 positioned upon and surrounding the inner hub at a point intermediate the support of the inner wheel hub upon the bearings B and C. This bearing 11 is however quite closely adjacent the bearing C. Adjacent its outer end the hub D of the inner wheel interiorly carries a double row self-aligning spherical roller bearing J having an outer race 12 and an inner race 13. The outer race is prevented from inward longitudinal movement by a ring 14 which extends between it and the outer race 2 of the bearing C. This ring additionally prevents outward longitudinal movement of the outer race 2 of the bearing C. The inner race 15 of the bearing C is prevented against outward movement by a thrust washer 16 backed up by a nut 17 carried by the outer threaded end 6 of the shaft and locked in place by a cotter key 18. Outward movement of the outer race 12 of the bearing J is prevented by a lock ring 19 which threadedly engages in the outer end of the inner wheel hub. This lock ring at its peripheral edge is provided with an opening 20 for the reception of a spring lock K which has a semi-circular shaped hub 21 and downwardly extending legs 22 and 23 the outer ends of which are serrated as at 24 for resilient locking engagement with the threads in the hub. This construction locks the bearing race ring lock ring 19 against rotation and economizes on axial space in the assembly. The spring lock K can be released by raising it which can be quickly and easily accomplished by inserting into the hole 60 suitable tool. The inner race ring 13 of the bearing J is retained in engagement with the shoulder 25 of the supplemental hub H of the outer wheel by the flared inner end 26 of a bolt 27 disposed within the hub and having an outer threaded end 28 carrying a self-locking nut 29 which engages the outer end of the supplemental hub and prevents outward movement of the outer wheel F. The flared end 26 of the bolt engages the inner end of the inner race 13 of the bearing J and prevents inward movement of the race.

The outer inwardly extending end 10 of the outer wheel hub constitutes in fact an integral cap with the result that interiorly the inner wall hub D forms a substantially closed chamber 30 for the reception of the lubricant for the bearings B, C and J. Any lubricant passing outwardly through the bearing J and reaching the bearing 11 through the space between the hubs D and G is prevented from escape by an oil seal ring 31. With the exception of the bearings B, C and J all of the other bearings in the assembly are self-lubricating and as a consequence of the construction immediately before described oil or grease is prevented from reaching the brake bands and the outer wheel clutching bands which is highly important to prevent slippage of the engagement of these mechanisms as will hereinafter appear.

A floating thrust washer 32 constitutes an abutment for the inner end of the inner race ring 33 of the inner spherical roller bearing B while the outer race ring thereof abuts a shoulder 34 which extends peripherally interior of the hub D. Briefly, defining the braking mechanism for the wheels and referring the reader to the C. S. Ash Patent 2,192,023 for more detailed description thereof, the following constitutes a construction whereby braking pressure applied to one of the independently rotating wheels automatically clutches the wheels together so that the braking action is applied uniformly to both wheels. A brake drum support L has a flat circular portion 35 encircling a self-lubricating bushing 36 carried by the inner end 4 of the inner wheel hub D and a ring portion 37 extending at right angles thereto which bears against and supports the inner wheel brake drum 38 as will hereinafter appear. The brake drum support L is accordingly rotatably mounted on the bushing but this rotative movement is limited as will later appear. Brake pressure supplying means of any suitable form may be provided and is illustrated as comprising an inner double shoe expanding type the shoes being pivotally supported as at 39 and being acted on by a suitable expander which is operated by suitable and conventional means convenient to the operator of the vehicle. The outer wheel web carries an inwardly extending drum 40 the outer circumferential edge thereof being in abutment with an oil seal 41 carried by the web 3 of the inner wheel. Interiorly the drum carries a nested clutching and de-clutching member which comprises an annular and circumferentially interrupted or split shoe 42 which on its outer face carries brake lining 43 or like suitable material. A bifurcated bracket 44 engages a lug 45 carried by the brake shoes to keep them in position to permit the shoes to effect the desired clutching action on the drum 40. A stop lug 46 normally holds the clutching shoes 42 in de-clutching position. Means are provided, operated automatically from the driver controlled brake mechanism, for expanding the shoe 42 whenever braking pressure is applied on the brake drum 38 of the inner wheel. To accomplish this the brake drum 38 and its support L have limited arcuate relative movement upon its supporting bushing 36 with respect to the inner wheel web 3 in order to effect the clutching and de-clutching action of the shoe 42 with the drum 40 of the outer wheel. As embodied, there are a plurality of arcuate slots 47 in spaced apart relation in the web 3 of the inner wheel through which extend spacing bosses 48 carried by the brake drum support L. These bosses are longitudinally apertured and carry bolts 49 secured at one end to the brake drum and at their other end securing to the ends of the bosses an annular plate 50. This annular plate constitutes a clutching acting plate in that it carries a finger, not shown, which extends into and occupies the gap between the ends of the clutching shoe 42. Whenever the brake is applied to cause braking action on the brake drum of the inner wheel the drum is retarded and there is a relative movement of the drum and the plate 50 with respect to the wheel 3 which results in the finger carried by this plate moving relatively to the clutching shoe 42 and causing it to be expanded into clutching engagement with the drum 40 of the outer wheel.

Although the wheel braking mechanism including the automatically operated clutching mechanism for the outer wheel when brake pressure is applied constitutes no part of the present invention mention, description and illustration thereof is made so that the manner in which the braking and clutching arrangement is protected from oil and grease by the lubricating arrangement of the present invention will be understood. In addition to the present invention providing an improved support for the load carried by the outer wheel which load is overhung in respect to the axle and the bearings for the inner wheel hub this structure provides the additional strength to withstand the thrust and strain imparted when braking action is applied to the wheels thus making the assembly more durable and materially reducing maintenance servicing.

In its broadest aspect the invention is not limited to the specific mechanism shown and described as departures may be made therefrom within the scope of the accompanying claim without departing from the principles of the invention and without sacrificing attainment of its objects and advantages.

I claim:

In a dual wheel structure for vehicles, an axle, an inner wheel having a hub surrounding and rotatively mounted on the axle and having interiorly of its outer end a bearing, a lock ring for preventing outward movement of said bearing, an outer wheel having a hub surrounding and rotatively mounted on the inner wheel hub, said outer wheel hub having an end rotatively supported on the interiorly positioned bearing of the inner wheel hub, a stud having an inner end engaging the bearing and an outer end removably carrying a head abutting and clamping the outer face of the outer end of the outer wheel hub, whereby the outer end of said outer wheel hub is held against outward movement from said bearing and the bearing is held against inward movement longitudinally of said inner wheel hub.

CHARLES P. TOLMAN.

REFERENCES CITED

The following references are of record in the file of this patent:

UNITED STATES PATENTS

| Number | Name | Date |
| --- | --- | --- |
| 1,906,243 | Baninger | May 2, 1933 |
| 2,192,023 | Ash | Feb. 27, 1940 |
| 2,275,025 | Ash | Mar. 3, 1942 |
| 2,356,942 | Mills | Aug. 29, 1944 |